(12) United States Patent
Kim et al.

(10) Patent No.: US 11,215,950 B2
(45) Date of Patent: Jan. 4, 2022

(54) HOLOGRAPHIC RECONSTRUCTION DEVICE AND METHOD

(71) Applicant: NAEILHAE, CO., LTD., Seongnam-si (KR)

(72) Inventors: Byung Mok Kim, Seoul (KR); Mal Eum Sung, Seoul (KR); Seong Jin Park, Seoul (KR); Sang Jin Lee, Seoul (KR)

(73) Assignee: Naeilhae, Co., Ltd., Seongnam-si (KR)

( * ) Notice: Subject to any disclaimer, the term of this patent is extended or adjusted under 35 U.S.C. 154(b) by 15 days.

(21) Appl. No.: 16/800,947

(22) Filed: Feb. 25, 2020

(65) Prior Publication Data

US 2020/0192283 A1    Jun. 18, 2020

Related U.S. Application Data

(63) Continuation of application No. PCT/KR2017/014076, filed on Dec. 4, 2017.

(30) Foreign Application Priority Data

Aug. 25, 2017    (KR) .......................... 10-2017-0107774

(51) Int. Cl.
*G03H 1/04* (2006.01)
*G03H 1/02* (2006.01)

(52) U.S. Cl.
CPC ............. *G03H 1/0402* (2013.01); *G03H 1/02* (2013.01); *G03H 1/0465* (2013.01);
(Continued)

(58) Field of Classification Search
CPC ...... G03H 1/0402; G03H 1/02; G03H 1/0465; G03H 2001/0212; G03H 2001/0216;
(Continued)

(56) References Cited

U.S. PATENT DOCUMENTS

2006/0192972 A1    8/2006    Bingham et al.
2013/0286403 A1*   10/2013   Matsubara ......... G02B 21/0052
                                                 356/457
(Continued)

FOREIGN PATENT DOCUMENTS

KR    10-2000-0037871 A    7/2000
KR    10-2006-0037456 A    5/2006
(Continued)

OTHER PUBLICATIONS

Machine translation of WO 2013/047709 A1. (Year: 2013).*
(Continued)

*Primary Examiner* — Kimberly N. Kakalec
(74) *Attorney, Agent, or Firm* — Knobbe Martens Olson & Bear LLP

(57) ABSTRACT

The present disclosure relates to improved holographic reconstruction device and a method. In one aspect, the present disclosure relates to improved holographic reconstruction device and method that can measure a digital hologram regardless of optical characteristics of an object to be measured, by an all-in-one type system integrating a transmissive system that measures an object transmitting light and a reflective system that measures an object reflecting light.

6 Claims, 4 Drawing Sheets

(52) U.S. Cl.
CPC ............... *G03H 2001/0212* (2013.01); *G03H 2001/0216* (2013.01); *G03H 2001/0469* (2013.01); *G03H 2222/12* (2013.01); *G03H 2223/24* (2013.01)

(58) Field of Classification Search
CPC ....... G03H 2001/0469; G03H 2222/12; G03H 2223/24; G03H 2001/0445; G03H 2001/0467; G03H 2223/26; G03H 2001/0471; G03H 1/0443; G03H 2001/005; G03H 1/22; G03H 1/04; G03H 2001/0224; G03H 2001/221
See application file for complete search history.

(56) References Cited

U.S. PATENT DOCUMENTS

| | | |
|---|---|---|
| 2014/0160541 A1 | 6/2014 | Kim et al. |
| 2019/0377301 A1 | 12/2019 | Leister et al. |

FOREIGN PATENT DOCUMENTS

| | | |
|---|---|---|
| KR | 10-2007-0087631 A | 8/2007 |
| KR | 10-1 139178 B | 4/2012 |
| KR | 10-1152798 B1 | 5/2012 |
| KR | 10-1203699 B1 | 11/2012 |
| KR | 10-2014-0074211 A | 6/2014 |
| KR | 10-1441245 B1 | 9/2014 |
| KR | 10-2016-0029359 A | 3/2016 |
| KR | 10-1621040 B1 | 5/2016 |
| KR | 10-1634170 B1 | 6/2016 |
| KR | 10-1716452 B1 | 3/2017 |
| KR | 10-2017-0079441 A | 7/2017 |
| WO | WO 2013-047709 A1 | 4/2013 |

OTHER PUBLICATIONS

Office Action received in Korean Patent Application No. 10-2017-0107774 dated Aug. 22, 2018, in 4 pages.
Notice of Allowance received in Korean Patent Application No. 10-2017-0107774 dated Mar. 11, 20198, in 3 pages.
Shin, S., et al., Study on Digital Holography with Conjugated Hologram, Korean Journal of Optics and Photonics 21(4): 146-150, Aug. 2010.
International Search Report received in International Patent Application No. PCT/KR2017/014076 dated May 24, 2018, in 2 pages.
Written Opinion received in International Patent Application No. PCT/KR2017/014076 dated May 24, 2018, in 3 pages.

* cited by examiner

HOLOGRAPHIC RECONSTRUCTION DEVICE AND METHOD

CROSS REFERENCE TO RELATED APPLICATIONS

This application is a continuation of International Patent Application No. PCT/KR2017/014076, filed on Dec. 4, 2017, which claims priority to Korean patent application No. 10-2017-0107774 filed on Aug. 25, 2017, contents of both of which are incorporated herein by reference in their entireties.

BACKGROUND

Technical Field

The present disclosure relates to improved holographic reconstruction device and a method.

In more detail, the present disclosure relates to improved holographic reconstruction device and method capable of measuring a digital hologram regardless of optical characteristics of an object to be measured, by an all-in-one type system integrating a transmissive system that measures an object transmitting light and a reflective system that measures an object reflecting light.

Description of Related Technology

As well known, holography is an imaging method that is contrived to improve the resolution of an electron microscope. While existing photography records only the distribution of bright and dark sides of an object, the holography simultaneously accumulates and reproduces all information that light has as a wave, i.e., amplitudes and images. The principle thereof is that coherent light from a laser light source is split into two light beams by a beam splitter, and if one of the two light beams illuminates a subject, light diffusely reflected from a surface of the subject reaches a holographic photosensitive material. This light beam is referred to as an object beam. The other light beam is diffused by a lens to directly illuminate a front surface of the holographic photosensitive material. This light beam is referred to as a reference beam (hereinafter referred to as a reference beam). This causes the object beam and the reference beam to interfere with each other on the holographic photosensitive material, thereby producing about 500 to 1500 very delicate and complicated interference patterns per 1 mm. A picture of these interference patterns is referred to as a hologram. If a light beam such as the reference beam illuminates the hologram produced as described above, an interference pattern acts as a diffraction grating, and thus light is diffracted at a position different from a direction in which the reference beam is incident. The collection of such diffracted light becomes like light produced by the first reflection from the object. In this way, a first object beam is reproduced in the hologram.

Therefore, if an inside of a reproduced wave front is looked, a first object is seen but looks as if being in there. Next, if a viewpoint is moved again, a position in which the object is seen also changes, and thus the object looks like a stereoscopic picture. Also, an original wave front of the object is reproduced and thus may interfere with a wave front coming from a very slightly deformed object. Therefore, such characteristics of the holography have been applied and used in various fields.

For example, a digital holography microscope is a microscope that measures a shape of an object by using digital holography technology. Therefore, while a general microscope is a device that measures a shape of an object by allowing a light source to illuminate the object to measure the intensity of light reflected from or transmitted through the object, the digital holography microscope is a device that measures interference and diffraction of light occurring when the light illuminates an object and records the same digitally to reconstruct shape information of the object from these information.

In other words, the digital holography technology is technology that generates single wavelength light such as a laser, splits the light into two beams by using a beam splitter, allows one beam (a reference beam) to directly illuminate an image sensor, allows the other beam (an object beam) to illuminate an object to be measured so that the beam transmitted through or reflected from the object to be measured illuminates the image sensor to cause the reference beam and the object beam to interfere with each other on the image sensor, records interference pattern information about the beams by the image sensor, and reconstructs a shape of the object to be measured, by using a computer with the recorded interference pattern information.

Other than the digital holography technology, existing optical holography technology is a method of reconstructing an imaginary shape of an object to be measured at an original position in which the object to be measured is located when recording the interference pattern information of the beams on a particular film and allowing the reference beam to illuminate the particular film on which an interference pattern is recorded to reconstruct the shape of the object to be measured.

Compared with the existing optical holography method, the digital holography microscope differs in that interference pattern information of light is measured by the digital image sensor and stored digitally, and the stored interference pattern information is processed through a mathematical operation method using a computer device or the like, rather than an optical method, to reconstruct a shape of an object to be measured.

An existing digital holography microscope frequently uses a single wavelength laser light source. However, if the single wavelength laser light source is used, a measurement resolution of an object, i.e., the smallest measurement unit, is limited to a wavelength of the single wavelength laser light source that is used. Also, if a two-wavelength or multi-wavelength laser light source is used in the existing digital holography microscope, the use of light sources having different wavelengths increases cost or hologram images are sequentially acquired by using light sources having different wavelengths, thereby making the real-time measurement of three-dimensional change information of an object to be measured difficult.

In addition, in the existing digital holography technology described above, when a computer generated hologram (CGH) is generated by a computer, displayed on a spatial light modulator (SLM), and illuminated by a reference beam to reconstruct a shape of an object to be measured, a three-dimensional hologram image of the object is acquired by diffraction of the reference beam. In this case, the use of an expensive (10 million won or more) SLM is needed, which causes considerable difficulty with practical use of the existing digital holography technology.

A number of patent documents for solving the drawbacks of the related digital holography technology described above are disclosed as follows.

According to these patent documents although an effect of reconstructing, in real time, three-dimensional shape information of an object to be measured is achieved by increasing a measurement resolution of the object to be measured, and measuring and recording, in real time, a hologram of the object to be measured changing over time, the following drawback still occurs.

In more detail, patent document 1, titled "Digital Holography Microscope and Method for Generating Digital Hologram Image," discloses a two-wavelength digital holography microscope device that, as shown in FIG. 1, includes a mixed light source unit 100, a wavelength division unit 200, an interference pattern acquisition unit 300, an object unit 400, an image sensor unit 500, an image storage unit 600, a control unit 700, and an object shape restoration unit 800.

The mixed light source unit 100 includes a mixed light source emitting unit 110 and a light source unit lens 120. The mixed light source emitting unit 110 emits mixed light having a wavelength band distributed in multiple non-uniform bands, and the light source unit lens 120 optically adjusts the mixed light generated by the mixed light source emitting unit 110 and makes the mixed light incident on the wavelength division unit 200.

The wavelength division unit 200 includes a first beam splitter 210, a first filter plate 220, a second filter plate 230, and a first reflector 240. The first beam splitter 210 receives the mixed light from the mixed light source unit 100 and splits the mixed light into two light beams. Here, the first beam splitter 210 performs a function of splitting the incident mixed light into different directions. The first filter plate 220 receives one of the light beams split by the first beam splitter 210 and acquires a first light beam having a preset single wavelength. Here, the light input to the first filter plate 220 is filtered while passing through the first filter plate 220, and the first light beam having the preset single wavelength is acquired according to characteristics of the first filter plate 220. In the same manner as the first filter plate 220, the second filter plate 230 receives the other one of the light beams split by the first beam splitter 210 and acquires a second light beam having a wavelength different from the wavelength of the first light beam. Also, the second light beam is transmitted to the interference pattern acquisition unit 300. The first reflector 240 receives the acquired first light beam from the first filter plate 220 and reflects the first light beam to the interference pattern acquisition unit 300.

The interference pattern acquisition unit 300 includes a second beam splitter 310, a third beam splitter 320, a second reflector 330, a third filter plate 340, and a third reflector 350. The second beam splitter 310 receives the first light beam input from the wavelength division unit 200 and splits the first light beam into a first object beam and a first reference beam. Here, the second beam splitter 210 performs a function of splitting the incident first light beam into different directions. The third beam splitter 320 receives the second light beam and splits the second light beam into a second object beam and a second reference beam, in the same manner as the second beam splitter 310. The second reflector 330 receives the first reference beam and transmits a first reflected reference beam, which is acquired by reflecting the first reference beam, to the second beam splitter 310. The third filter plate 340 receives the first reference beam split by the second beam splitter 310, transmits the first reference beam to the second reflector 330, receives the first reflected reference beam that is reflected, and transmits the first reflected reference beam to the second beam splitter 310. Also, the third filter plate 340 prevents the second object beam from reaching the second reflector 330 when the second object beam reaches the second beam splitter 310 to be split and partially proceed toward the second reflector 330. For this, the third filter plate 340 is a filter plate having the same characteristics as the first filter plate 220 in transmitting light. The third reflector 350 receives the second reference beam and transmits a second reflected reference beam, which is acquired by reflecting the second reference beam, to the third beam splitter 320. Here, the second reflector 330 and the third reflector 350 are constructed to adjust angles under control of the control unit 700, thereby embodying an off-axis hologram.

The first object beam and the second object beam acquired as described above are respectively converted into a first reflected object beam and a second reflected object beam through the following process and then transmitted to the image sensor unit 500. The second beam splitter 310 makes the first object beam split as described above incident on the object to be measured, which is mounted on the object unit 400, and makes the second object beam split and transmitted by the third beam splitter 320 incident on the object to be measured. In this case, the reflected beam acquired by reflecting the incident first object beam incident from the object to be measured is referred to as the first reflected object beam. Also, the reflected beam acquired by reflecting the second object beam incident from the object to be measure is referred to as the second reflected object beam. The second beam splitter 310 receives the first reflected object beam and the second reflected object beam reflected as described above and transmits the first reflected object beam and the second reflected object beam to the third beam splitter 320. The third beam splitter 320 transmits the first reflected object beam and the second reflected object beam received as described above to the image sensor unit 500.

Also, the first reflected reference beam and the second reflected reference beam acquired as described above are transmitted to the image sensor unit 500 through the following process. In detail, the second beam splitter 310 receives the first reflected reference beam reflected from the second reflector 330 and transmits the first reflected reference beam to the third beam splitter 320. The third beam splitter 320 receives the first reflected reference beam transmitted from the second beam splitter 310 and the second reflected reference beam reflected from the third reflector 350 and transmits the first reflected reference beam and the second reflected reference beam to the image sensor unit 500. Therefore, the first reflected object beam, the first reflected reference beam, the second reflected object beam, and the second reflected reference beam are all transmitted from the third beam splitter 320 in the direction of the image sensor unit 500 and then interfere with one another, thereby generating an interference pattern.

Meanwhile, the second reflector 330 and the third reflector 350 are capable of adjusting angles in multiple directions under control of the control unit 700 to construct an off-axis system that allows beams having different wavelengths to form different interference patterns.

In other words, as the angles of the second reflector 330 and the third reflector 350 become different from each other, a separation occurs between a direction of the first reflected reference beam reflected from the second reflector 330 and a direction of the second reflected reference beam reflected from the third reflector 350, and thus, when the first reflected reference beam and the second reflected reference beam are combined with the first reflected object beam and the second reflected object beam reaching the image sensor unit 500 to form interference patterns, interference patterns differently off the axis in respective wavelengths are formed.

The object unit 400 includes an object holder 410 and an objective lens 420. The object holder 410 fixes the object to be measured on a holder so that the object is measured, and the objective lens 420 optically adjusts the first object beam and the second object beam incident on the object to be measured.

The image sensor unit 500 projects the interference pattern acquired by the interference pattern acquisition unit 300 to a digital image sensor, measures the projected interference pattern by using the digital image sensor, and converts the measured value into a discrete signal. The recording of the interference pattern is usually referred to as a hologram. Various types of image sensors, such as a CCD and the like, may be used as the digital image sensor mentioned above.

The image storage unit 600 stores interference pattern information converted into the discrete signal by the image sensor unit 500 in various types of storage media such as a memory, a disk device, and the like.

The control unit 700 controls the interference pattern acquisition unit 300 such as adjusting positions and angles of the second reflector 330 and the third reflector 350 to embody the off-axis system and acquire the interference pattern as described above, controls the object unit 400 such as adjusting the objective lens 420 to adjust the first object beam and the second object beam incident on the object to be measured, controls the image sensor unit 500 to measure the interference pattern and convert information thereof into the discrete signal, and controls the image storage unit 600 to store the interference pattern information converted into the discrete signal.

The object shape restoration unit 800 includes a phase information acquisition unit 810, a thickness information acquisition unit 820, and a shape restoration unit 830. The phase information acquisition unit 810 acquires phase information of the interference pattern for the first light beam and phase information of the interference pattern for the second light beam, respectively, by using the interference pattern information, the thickness information acquisition unit 820 acquires thickness information of the object to be measured by using the phase information, and the shape restoration unit 830 restores a real-time three-dimensional shape of the object to be measured, by using the thickness information. Here, the thickness information of the object to be measured includes information about a difference between paths along which the object beam and the reference beam respectively proceed. Because of the difference between the optical paths of the object beam and the reference beam described above, the interference pattern is formed when the object beam and the reference beam overlap each other.

As described above, in disclosed patent document 1, a mixed light source having a wavelength band distributed in multiple non-uniform bands is used, and thus a wavelength division unit splits light into a first light beam and a second light beam having different wavelengths by using a first filter plate, a second filter plate, and a first reflector to acquire at least two or more single wavelengths. Also, an interference pattern acquisition unit further uses a third beam splitter for splitting the second light beam, a third reflector for reflecting the second light beam, and a third filter plate for preventing the second light beam from being incident on a second reflector. As a result, an entire structure of the device becomes complicated, entire optical noise of the device increases with an increase in the use of optical elements, and entire manufacturing cost is expensive.

Therefore, as there is a need for a new method for solving the above drawbacks with using a single wavelength light source, a number of patent documents meeting the need have been disclosed.

However, optical systems of most of the disclosed patent documents may be broadly classified into a transmissive system that measures an object transmitting light or a reflective system that reflects light to measure a digital hologram.

In more detail, patent documents 2, 3, 5, and 6 disclose reflective measurement devices that use two wavelengths and are capable of measuring only an object reflecting light. Here, patent document 2 has a drawback in that a laser having two different wavelengths is needed, and an optical interferometer system is complicated, patent document 3 has a drawback in that two image sensors are needed, white light having low coherence is used, and an optical interferometer system is complicated as in patent document 2, patent document 5 has a drawback in that a laser having two different wavelengths is needed, an optical interferometer system is complicated as in patent document 2, and a construction of a suggested system thereof does not allow a hologram to be generated, and patent document 6 has a drawback in that a laser having two different wavelengths is needed, and an optical interferometer system is complicated as in patent document 2.

Also, patent document 4 discloses a transmissive measurement device that uses one wavelength and is capable of measuring only an object transmitting light but needs to take two images, and thus an error occurs due to time delay.

Therefore, in order to solve this, a transmissive system and a reflective system need to be used according to optical characteristics of an object to be measured, such as an object transmitting light or an object reflecting light, to enable a measurement. However, since expensive equipment, each costing hundreds of millions of won, needs to be purchased to measure a digital hologram regardless of the characteristics of the object to be measured, additional cost is needed.

RELATED ART

1. Korean Patent Publication 10-1634170 registered on Jun. 22, 2016
2. Korean Patent Publication 10-1152798 registered on May 29, 2012
3. Korean Patent Publication 10-1139178 registered on Apr. 16, 2012
4. Korean Patent Publication 10-1203699 registered on Nov. 15, 2012
5. Korean Patent Publication 10-1441245 registered on Sep. 5, 2014
6. Korean Patent Publication 10-1716452 registered on Mar. 8, 2017

SUMMARY

Provided is an improved holographic reconstruction device to measure a digital hologram regardless of optical characteristics of an object to measured, by an all-in-one type system integrating a transmissive system that measures an object transmitting light and a reflective system that reflects an object reflecting light.

Provided is also an improved holographic reconstruction method for selecting a transmissive mode for measuring an object transmitting light and a reflective mode for measuring an object reflecting light to measure a digital hologram regardless of optical characteristics of an object to be measured.

According to an aspect of the present disclosure, an improved holographic reconstruction device may include: a light source unit emitting single wavelength light; a first beam splitter splitting the single wavelength light emitted from the light source unit into a first transmitted split beam and a second transmitted split beam; a plurality of optical mirrors reflecting the first transmitted split beam split by the first beam splitter; a second beam splitter splitting the second transmitted split beam split by the first beam splitter into a first reflected split beam and a second reflected split beam; an object beam objective lens allowing the first transmitted split beam reflected from the plurality of optical mirrors and then transmitted through an object to be measured or the first reflected split beam split by the second beam splitter to pass therethrough; a reference beam objective lens allowing the second reflected split beam split by the second beam splitter to pass therethrough; a position adjustment mirror to which the second reflected split beam passing through the reference beam objective lens is transmitted; a recording medium recording an interference pattern formed when the first transmitted split beam transmitted through the object to be measured or the first reflected split beam reflected from a surface of the object to be measured and the second reflected split beam passing through the reference beam objective lens and reflected from the position adjustment mirror respectively pass through the object beam objective lens and the reference beam objective lens and are transmitted to the second beam splitter; and a processor receiving and storing an image file generated by converting the interference pattern transmitted from the recording medium, wherein a beam transmitting object hologram and a beam reflecting object hologram are selectively acquired by the processor according to a transmissive mode and a reflective mode.

According to another aspect of the present disclosure, an improved holographic reconstruction method may include: a) selecting two types of measurement modes of an object hologram of an object to be measured (S1); b) measuring the object hologram according the selected mode (S2); c) removing direct current, imaginary image, curvature information of the measured object hologram (S3); d) extracting phase information of the object hologram (S4); and e) reconstructing three-dimensional shape information and quantitative size (thickness) information of the object to be measured (S5).

Through the solution to the above problems, improved holographic reconstruction device and method of the present disclosure provide the following effects.

A complicated optical device structure and consequent considerable cost, which are needed for a one-shot digital holography reconstruction using a single object hologram image, according to the related art, may be solved.

A holographic reconstruction may be achieved with a simple structure and low cost.

The improved holographic reconstruction device and method of the present disclosure have versatility of being applicable to both reflective and transmissive holographic reconstruction devices of the related art.

In particular, a reference beam does not need to be used when reconstructing a hologram, and a quantitative three-dimensional image of an object to be measured may be reconstructed in real time.

The improved holographic reconstruction device and method of the present disclosure may be applied to devices that are used for detecting defects of ultrafine structures such as TFTs and semiconductors, medical devices that need displaying precise three-dimensional images, and devices that are used for detecting, verifying, or displaying various fields including refractive index error detections of transparent objects, such as other lens, and the like.

A digital hologram may be measured regardless of optical characteristics of an object to be measured by selectively selecting a transmissive mode and a reflective mode by an all-in-one type system that integrates reflective and transmissive holographic reconstruction devices of the related art, thereby solving additional cost.

Additional advantages of the present disclosure may be clearly understood from the following description with reference to the accompanying drawings in which the same or like reference numerals denote like elements.

DETAILED DESCRIPTION

Figure 1:
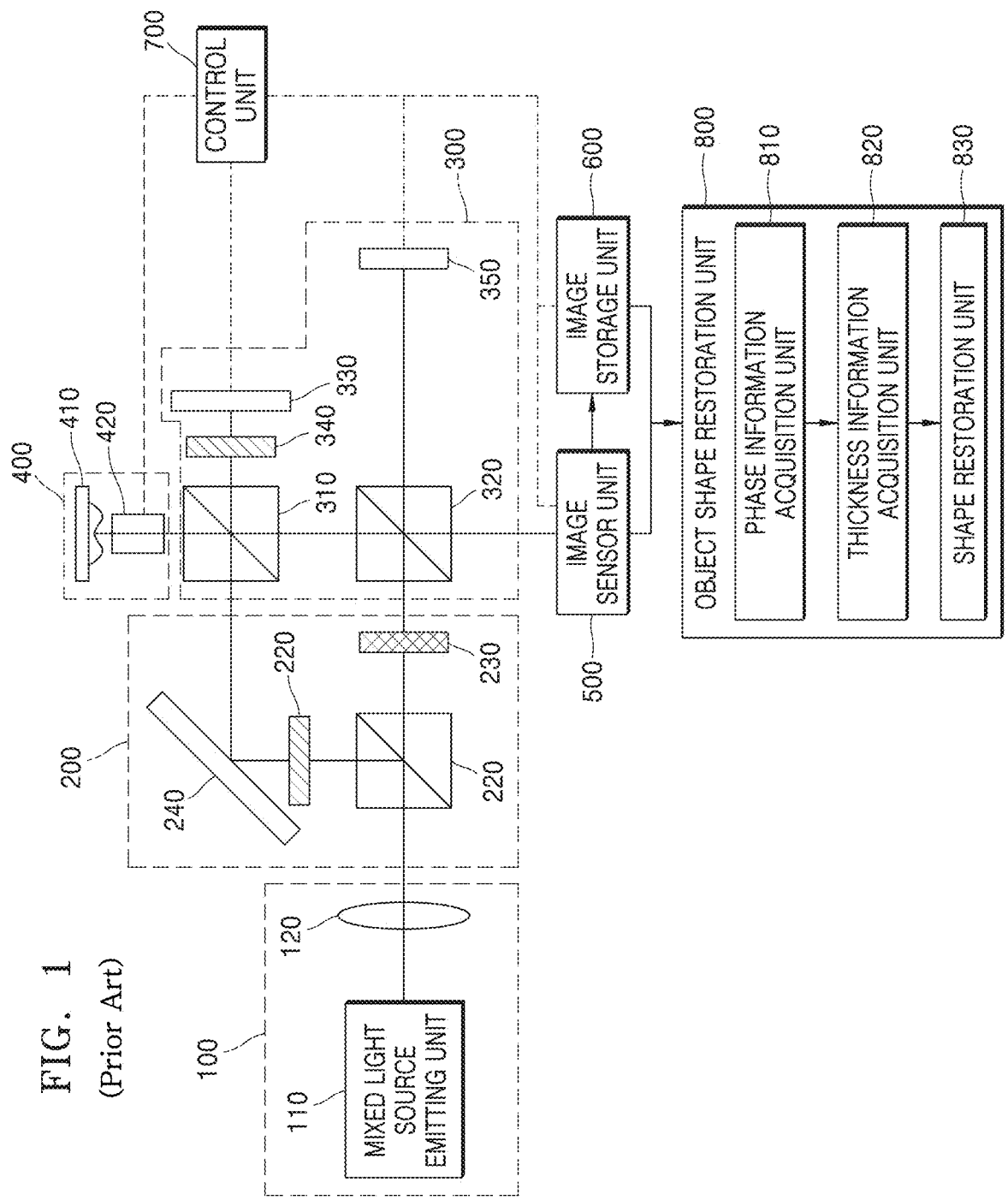
FIG. 1 is a block diagram illustrating in detail a two-wavelength digital holography microscope device according to the disclosed related art.

Hereinafter, exemplary embodiments of the present disclosure will be described in detail with reference to the accompanying drawings. Here, like reference numerals denote like elements in the accompanying drawings. Also, in describing the present disclosure, when detailed descriptions of associated elements or functions are determined as being unneeded, the detailed descriptions thereof may be omitted.

Figure 2:
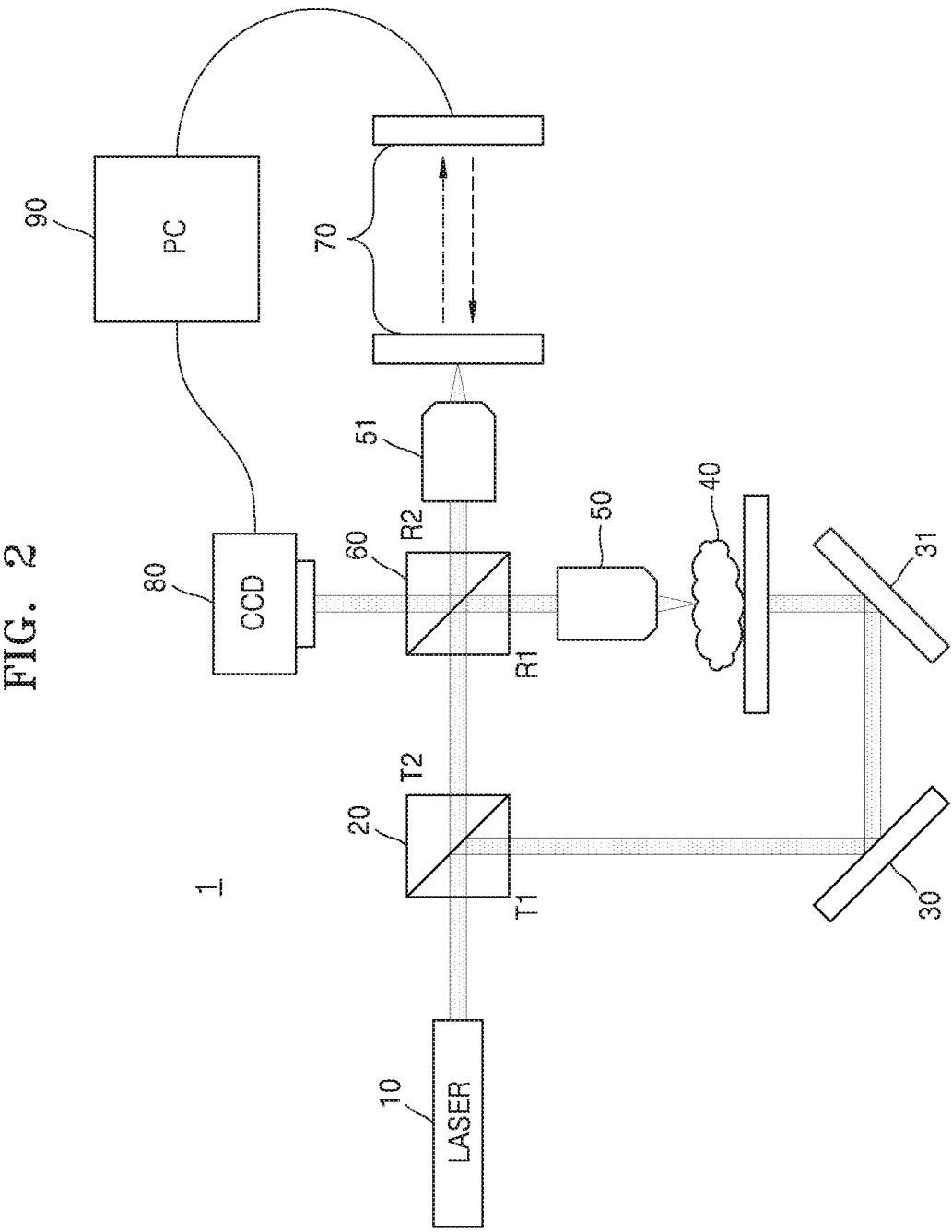
FIG. 2 is a schematic block diagram illustrating an improved holographic reconstruction device according to an exemplary embodiment of the present disclosure.

Referring to FIG. 2 illustrating an improved holographic reconstruction device according to an embodiment of the present disclosure, an improved holographic reconstruction device 1 according to an embodiment of the present disclosure may be an all-in-one type digital holographic microscope that selectively executes a transmissive mode for measuring an object transmitting light and a reflective mode for measuring an object reflecting light.

The improved holographic reconstruction device 1 according to an embodiment of the present disclosure may include: a light source unit 10 that emits single wavelength light; a first beam splitter 20 that splits the single wavelength light emitted from the light source unit 10 into a first transmitted split beam T1 and a second transmitted split beam T2; a plurality of optical mirrors 30 and 31 that reflect the first transmitted split beam T1 split by the first beam splitter 20; a second beam splitter 60 that splits the second transmitted split beam T2 split by the first beam splitter 20 into a first reflected split beam R1 and a second reflected split beam R2; an object beam objective lens 50 that allows the first transmitted split beam T1 reflected from the plurality of optical mirrors 30 and 31 and transmitted through an object 40 to be measured or the first reflected split beam R1 split by the second beam splitter 60 to pass therethrough; a reference beam objective lens 51 that allows the second reflected split beam R2 split by the second beam splitter 60 to pass therethrough; a position adjustment mirror 70 to which the second reflected split beam R2 passing through the reference beam objective lens 51 is transmitted; a recording medium 80 that records an interference pattern formed when the first transmitted split beam T1 transmitted through the object 40 to be measured or the first reflected split beam R1 reflected from a surface of the object 40 to be measured and the second reflected split beam R2 passing through the reference beam objective lens 51 and reflected from the position adjustment mirror 70 respectively pass through the object beam objective lens 50 and the reference beam objective lens 51 and are transmitted to the second beam splitter 60; and a processor 90 that receives and stores an image file generated by converting the interference pattern transmitted from the recording medium 80.

The processor 90 of the improved holographic reconstruction device 1 according to an embodiment of the present disclosure described above may be embodied as a device capable of performing an arithmetic operation, such as a microprocessor, a personal computer (PC), or the like, and the recording medium 80 may be embodied as an image sensor, such as a charge coupled device (CCD), complementary metal-Oxide semiconductor (CMOS), or the like.

The improved holographic reconstruction device 1 according to an embodiment of the present disclosure may selectively acquire a beam transmitting object hologram and a beam reflecting object hologram by the processor 90 thereof according to a transmissive mode and a reflective mode. In other words, the processor 90 of the improved holographic reconstruction device 1 as an all-in-one type according to an embodiment of the present disclosure corrects a difference in an optical path of a beam in the transmissive mode and the reflective mode by variably adjusting a position of the position adjustment mirror 70. Therefore, the beam transmitting object hologram or the beam reflecting object hologram may be transmitted to the processor 90 through the recording medium 80 (e.g., a CCD) to be acquired in the form of an image file.

In more detail, the improved holographic reconstruction device 1 according to an embodiment of the present disclosure splits the light emitted from a laser, which is the light source unit 10, into the first transmitted split beam T1 and the second transmitted split beam T2 through the first beam splitter 20 in the transmissive mode for measuring an object transmitting light.

The first transmitted split beam T1 is reflected respectively from the plurality of optical mirrors 30 and 31 to be transmitted to the object 40 to be measured, passes through the object 40 to be measured, and passes through the object beam objective lens 50 to the second beam splitter 60. In an embodiment of the present disclosure, although the plurality of optical mirrors 30 and 31 are illustrated as being embodied as two optical mirrors, those skilled in the art fully understand that the plurality of optical mirrors 30 and 31 may be embodied as three or more optical mirrors. The second transmitted split beam T2 passes through the second beam splitter 60 and the reference beam objective lens 51, is reflected from the position adjustment mirror 70, and then passes through the reference beam objective lens 51 to the second beam splitter 60.

The first and second transmitted split beams T1 and T2 that meet at the second beam splitter 60 form an interference pattern (the beam transmitting object hologram) for a beam transmitting part of the object 40 to be measured. Here, the first transmitted split beam T1 corresponds to an object beam of the beam transmitting object hologram, and the second transmitted split beam T2 corresponds to a reference beam of the beam transmitting object hologram.

In the reflective mode for measuring an object reflecting light, the light emitted from the laser, which is the light source unit 10, is split into the first transmitted split beam T1 and the second transmitted split beam T2 through the first beam splitter 20.

The second transmitted split beam T2 is split into the first reflected split beam R1 and the second reflected split beam R2 by the second beam splitter 60. The first reflected split beam R1 passes through the object beam objective lens 50, is reflected from the object 40 to be measured, and then repasses through the object beam objective lens 50 to the second beam splitter 60. The second reflected split beam R2 passes through the reference beam objective lens 51, is reflected from the position adjustment mirror 70, and then repasses through the reference beam objective lens 51 to the second beam splitter 60.

The first reflected split beam R1 and the second reflected split beam R2 that meet at the second beam splitter 60 form an interference pattern (the beam reflecting object hologram) for a beam reflecting part of the object 40 to be measured. Here, the first reflected split beam R1 corresponds to an object beam of the beam reflecting object hologram, and the second reflected split beam R2 corresponds to a reference beam of the beam reflecting object hologram.

Here, the difference in the optical path of the beam occurring in the transmissive mode and the reflective mode is corrected by adjusting the position of the position adjustment mirror 70, for example, by the processor 90 that is embodied as a PC. The beam transmitting object hologram and the beam reflecting object hologram are respectively transmitted to the PC, which is the processor 90, through the CCD, which is the recording medium 80, to be acquired in the form of the image file.

If a measurement is performed by selecting the transmissive mode by the improved holographic reconstruction device 1 according to an embodiment of the present disclosure described above, the acquired beam transmitting object hologram is the interference pattern for the beam transmitting part of the object 40 to be measured. The beam transmitting object hologram acquired as described above may be expressed as a complex conjugated hologram as in Equation 1 below:

$$|U_T(x,y,0)|^2 = |O_T(x,y)|^2 + |R_T(x,y)|^2 + O^*_T(x,y)R_T(x,y) + O_T(x,y)R^*_T(x,y) \quad (1)$$

wherein x and y denote spatial coordinates, $U_T(x,y,0)$ denotes the acquired beam transmitting object hologram, $O_T(x,y)$, $R_T(x,y)$ denote the object beam and the reference beam of the beam transmitting object hologram, and $O^*_T(x,y)$, $R^*_T(x,y)$ denote complex conjugates of the object beam and the reference beam of the beam transmitting object hologram.

In contrast, if a measurement is performed by selecting the reflective mode, the acquired beam reflecting object hologram is the interference pattern for the beam reflecting part of the object 40 to be measured. The beam reflecting object hologram acquired as described above may be expressed as a complex conjugated hologram as in Equation 2 below:

$$|U_R(x,y,0)|^2 = |O_R(x,y)|^2 + |R_R(x,y)|^2 + O^*_R(x,y)R_R(x,y) + O_R(x,y)R^*_R(x,y) \quad (2)$$

wherein x and y denote spatial coordinates, $U_R(x,y,0)$ denotes the acquired beam reflecting object hologram, $O_R(x,y)$, $R_R(x,y)$ denote the object beam and the reference beam of the beam reflecting object hologram, and $O^*_R(x,y)$, $R^*_R(x,y)$ denote complex conjugates of the object beam and the reference beam of the beam reflecting object hologram.

Hereinafter, a detailed method of reconstructing a three-dimensional shape of an object from two types of object holograms acquired above will be described.

In detail, referring to FIGS. 2 through 4 again, as described above, 2D Fourier Transform is performed to remove direct current and imaginary image information from the beam transmitting object hologram (S21 of FIG. 3) acquired by selecting the transmissive mode by the processor 90 (S3 of FIG. 3).

Figure 3:
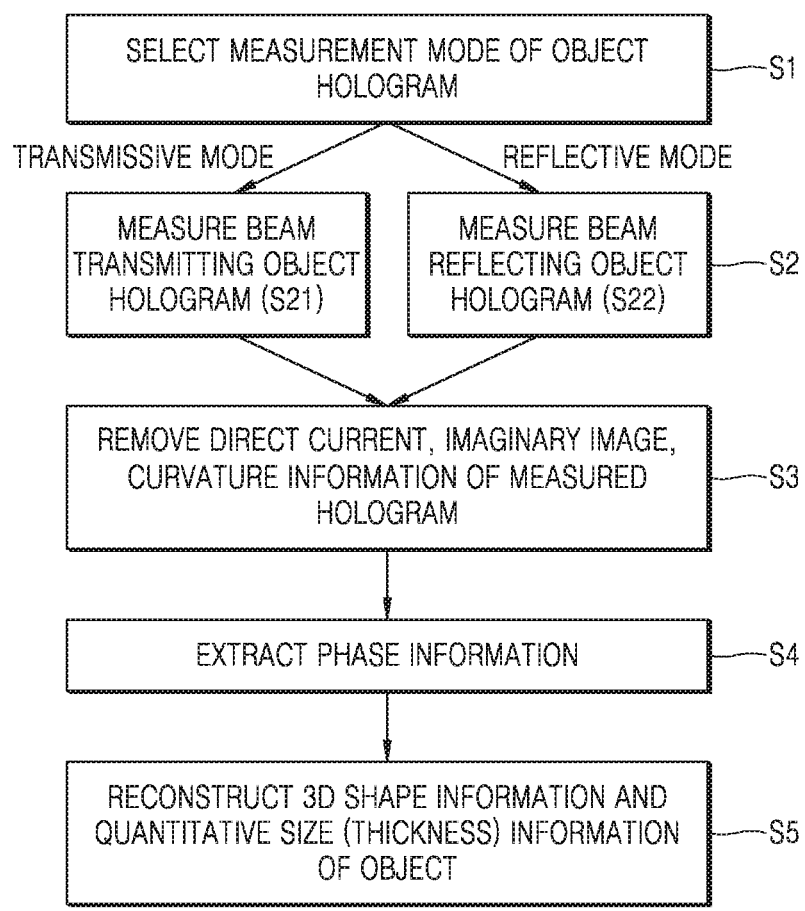
FIG. 3 is a flowchart illustrating an improved holographic reconstruction method according to an embodiment of the present disclosure.
Figure 4:
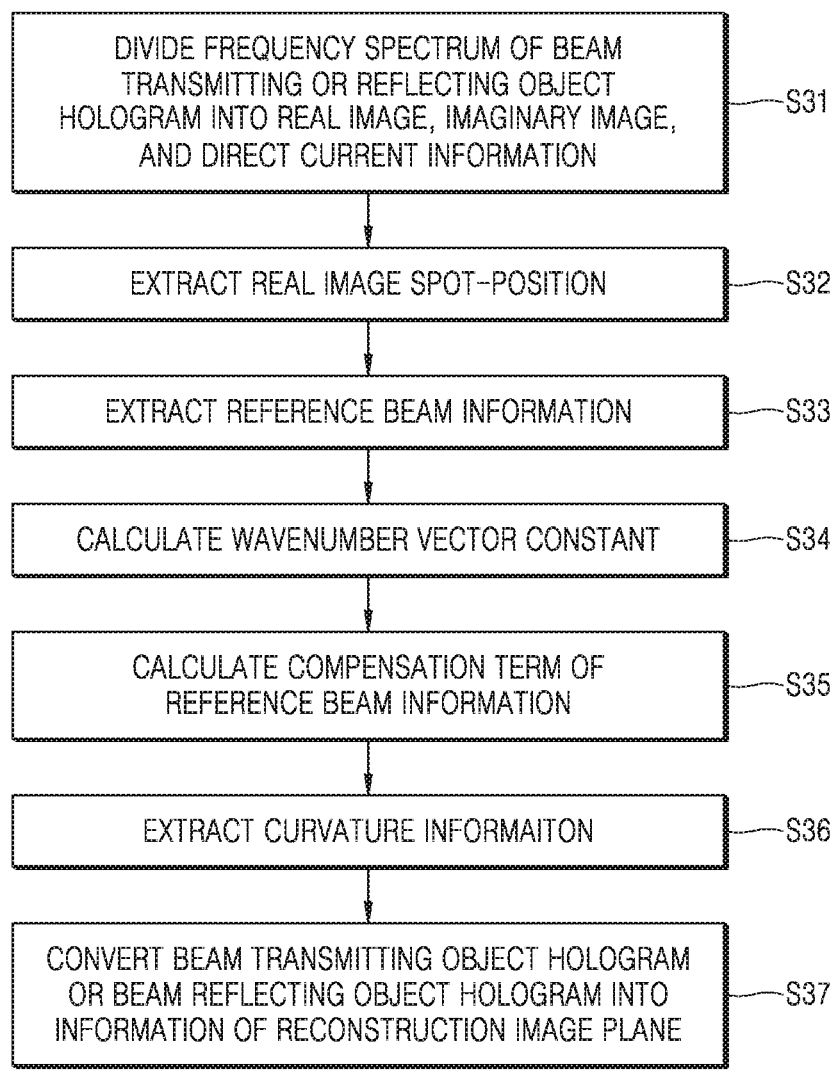
FIG. 4 is a flowchart illustrating in detail a detailed embodiment operation of operation S3 of the improved holographic reconstruction method of FIG. 3.

In the case of the transmissive mode, a frequency spectrum of the beam transmitting object hologram acquired by 2D Fourier Transform appears to be divided into real image, imaginary image, and direct current (DC) information of the beam transmitting object hologram (S31 of FIG. 4). To remove the divided imaginary image and DC information of the beam transmitting object hologram, for example, an automatic real image spot-position extraction algorithm is applied to extract phase information from a real image spot-position (S3 of FIG. 3 and S32 of FIG. 4).

Thereafter, reference beam information of the beam transmitting object hologram is extracted by using a frequency filtering algorithm (S33 of FIG. 4).

A wavenumber vector constant of the extracted reference beam information is calculated to calculate a compensation term of the extracted reference beam information (S34 of FIG. 4). The compensation term of the extracted reference beam information is calculated by using the calculated wavenumber vector constant (S35 of FIG. 4). In this case, the compensation term of the extracted reference beam information is a conjugate term of the beam transmitting object hologram.

Thereafter, curvature information is extracted from the beam transmitting object hologram to compensate for a curvature aberration of the object beam objective lens 51 used when measuring a hologram (S36 of FIG. 4). For this, for example, a curvature information compensation term is generated by using an automatic frequency curvature compensation algorithm.

The compensated beam transmitting object hologram is acquired by multiplying the beam transmitting object hologram by the compensation term of the extracted reference beam information and the curvature information compensation term (S5 of FIG. 3 and S37 of FIG. 4).

Meanwhile, even in the case of the reflective mode, the same method as in the transmissive mode described above is also applied to the beam reflecting object hologram acquired by 2D Fourier Transform to acquire the compensated beam reflecting object hologram. The compensated beam transmitting object hologram and the compensated beam reflecting object hologram acquired in this manner may be respectively expressed as in Equations 3 and 4 below:

$$|U_{CT}(f_x,f_y,0)|^2 = F\{O_T(x,y)R^*_T(x,y)R_{CT}(x,y)R_{CAT}(x,y)\} \quad (3)$$

$$|U_{CR}(f_x,f_y,0)|^2 F\{O_R(x,y)R^*_R(x,y)R_{CR}(x,y)R_{CAR}(x,y)\} \quad (4)$$

wherein $U_{CT}(f_x,f_y,0)$ and $U_{CR}(f_x,f_y,0)$ respectively denote the compensated beam transmitting object hologram and the compensated beam reflecting object hologram, $O_T(x,y)$, $R^*_T(x,y)$ denote the object beam and the reference beam of the beam transmitting object hologram, $O_R(x,y)$, $R^*_R(x,y)$ denote the object beam and the reference beam of the beam reflecting hologram, $R_{CT}(x,y)$ denotes the compensation term of the reference beam information of the beam transmitting object hologram, $R_{CAT}(x,y)$ denotes the curvature information compensation term of the beam transmitting object hologram, $R_{CR}(x,y)$ denotes a compensation term of reference beam information of the beam reflecting object hologram, and $R_{CAR}(x,y)$ denotes a curvature information compensation term of the beam reflecting object hologram.

The compensated beam transmitting object hologram expressed as in Equation 3 above is converted into information of a reconstruction image plane by using an angular spectrum propagation algorithm.

Phase information is extracted from the converted compensated object hologram through inverse 2D Fourier Transform. Here, the acquired phase information includes only phase information of the beam transmitting part of the object 40 to be measured, in the form of removing remaining information (i.e., information about light and curvature information of the object beam objective lens 50) except for the phase information of the beam transmitting part of the object 40 that the acquired beam transmitting object hologram has.

The same method is applied to the compensated beam reflecting object hologram to extract phase information. Here, the acquired phase information includes only phase information of the beam reflecting part of the object 40 to be measured, in the form of removing remaining information (i.e., information about light and the curvature information of the object beam objective lens 50) except for the phase information of the beam reflecting part of the object 40 that the acquired beam reflecting object hologram has.

The extracted phase information of the beam transmitting part of the object 40 to be measured and the extracted phase information of the beam reflecting part of the object 40 to be measured are respectively compensated for distorted phase information by using a 2D phase unwrapping algorithm, and quantitative thickness information of the object 40 to be measured is calculated by using the same (S5 of FIG. 3). The quantitative thickness information may be expressed as in Equation 5 below:

$$\Delta L = \frac{\lambda(\Delta\phi_T(x,y) + \Delta\phi_T(x,y))}{2\pi \, \Delta n(x,y)} \quad (5)$$

Wherein $\Delta L$ denotes the quantitative thickness information of the object 40 to be measured, $\lambda$ denotes a wavelength of a light source used when acquiring the object hologram, $\Delta\Phi_T(x,y)$ denotes the phase information of the beam transmitting part of the object 40 to be measured, $\Delta\Phi_R(x,y)$ denotes the phase information of the beam reflecting part of the object 40 to be measured, and $\Delta n(x,y)$ denotes a difference between refractive indexes of the object 40 to be measured and air. A 3D shape of an object is reconstructed by using calculated quantitative thickness information of the object.

FIG. 3 is a flowchart illustrating an improved holographic reconstruction method according to an embodiment of the present disclosure.

Referring to FIGS. 2 and 3, the improved holographic reconstruction method according to an embodiment of the present disclosure includes: a) selecting two types of measurement modes of an object hologram of the object 40 to be measured (S1); b) measuring the object hologram according to the selected measurement mode (S2); c) removing direct current, imaginary image, and curvature information of the measured object hologram (S3); d) extracting phase information of the object hologram (S4); and e) reconstructing 3D shape information and quantitative size (thickness) information of the object 40 to be measured (S5).

In the improved holographic reconstruction method according to an embodiment of the present disclosure described above, operation b) may include operation S21 measuring the object hologram in a transmissive mode or operation S22 measuring the object hologram in a reflective mode.

Also, a beam transmitting object hologram acquired in operation S21 may be expressed as a complex conjugated hologram corresponding to an interference pattern for a beam transmitting part of the object 40 to be measured as in Equation 1 below:

$$|U_T(x,y,0)|^2 = |O_T(x,y)|^2 + |R_T(x,y)|^2 + O^*_T(x,y)R_T(x,y) + O_T(x,y)R^*_T(x,y) \quad (1)$$

wherein x and y denote spatial coordinates, $U_T(x,y,0)$ denotes the acquired beam transmitting object hologram, $O_T(x,y)$, $R_T(x,y)$ denote an object beam and a reference beam of the beam transmitting object hologram, and $O^*_T(x,y)$, $R^*_T(x,y)$ denote complex conjugates of the object beam and the reference beam of the beam transmitting object hologram.

In contrast, a beam reflecting object hologram acquired in operation S22 may be expressed as a complex conjugated hologram corresponding to an interference pattern for a beam reflecting part of the object 40 to be measured as in Equation 2 below:

$$|U_R(x,y,0)|^2 = |O_R(x,y)|^2 + |R_R(x,y)|^2 + O^*_R(x,y)R_R(x,y) + O_R(x,y)R^*_R(x,y) \quad (2)$$

wherein x and y denote spatial coordinates, $U_R(x,y,0)$ denotes the acquired beam reflecting object hologram, $O_R(x,y)$, $R_R(x,y)$ denote an object beam and a reference beam of the beam reflecting object hologram, and $O^*_R(x,y)$, $R^*_R(x,y)$ denote complex conjugates of the object beam and the reference beam of the beam reflecting object hologram.

In the improved holographic reconstruction method according to an embodiment of the present disclosure described above, if the measured object hologram is the beam transmitting object hologram, operation c) may include: c1) dividing a frequency spectrum of the beam transmitting object hologram, which is acquired by performing 2D Fourier Transform, into real image, imaginary image, and direct current information of the beam transmitting object hologram to remove the direct current and imaginary image information from the beam transmitting object hologram; c2) extracting a real image spot-position by applying an automatic real image spot-position extraction algorithm to remove the divided imaginary image and DC information of the beam transmitting object hologram; c3) extracting reference beam information of the beam transmitting object hologram by using a frequency filtering algorithm; c4) calculating a wavenumber vector constant of the extracted reference beam information; c5) calculating a compensation term of the extracted reference beam information by using the calculated wavenumber vector constant; c6) extracting curvature information from the beam transmitting object hologram to compensate for a curvature aberration of the object beam objective lens 50 used when measuring the object hologram; and c7) converting the beam transmitting object hologram having the compensated compensation term and the compensated curvature information into information of a reconstruction image plane by using an angular spectrum propagation algorithm.

Here, operation c6) may include: generating a curvature information compensation term by using an automatic frequency curvature compensation algorithm; and acquiring the compensated beam transmitting object hologram by multiplying the beam transmitting object hologram by the compensation term of the extracted reference beam information and the curvature information compensation term.

Even in the case of the reflective mode, the same method as in the transmissive mode described above is also applied to the beam reflecting object hologram acquired by 2D Fourier Transform to acquire a compensated beam reflecting object hologram.

In the improved holographic reconstruction method according to an embodiment of the present disclosure, the compensated beam transmitting object hologram or the compensated beam reflecting object hologram may be expressed as in Equation 3 or 4:

$$|U_{CT}(f_x,f_y,0)|^2 = F\{O_T(x,y)R^*_T(x,y)R_{CT}(x,y)R_{CAT}(x,y)\} \quad (3)$$

$$|U_{CR}(f_x,f_y,0)|^2 = F\{O_R(x,y)R^*_R(x,y)R_{CR}(x,y)R_{CAR}(x,y)\} \quad (4)$$

wherein $U_{CT}(f_x,f_y,0)$ denotes the compensated beam transmitting object hologram, $U_{CR}(f_x,f_y,0)$ denotes the compensated beam reflecting object hologram, $O_T(x,y)$, $R^*_T(x,y)$ denote the object beam and the reference beam of the beam transmitting object hologram, $O_R(x,y)$, $R^*_R(x,y)$ denote the object beam and the reference beam of the beam reflecting hologram, $R_{CT}(x,y)$ denotes the compensation term of the reference beam information of the beam transmitting object hologram, $R_{CAT}(x,y)$ denotes the curvature information compensation term of the beam transmitting object hologram, $R_{CR}(x,y)$ denotes a compensation term of reference beam information of the beam reflecting object hologram, and $R_{CAR}(x,y)$ denotes a curvature information compensation term of the beam reflecting object hologram.

In the improved holographic reconstruction method according to an embodiment of the present disclosure described above, operation d) may be embodied as operation extracting phase information of the converted compensated object hologram through inverse 2D Fourier Transform, wherein the acquired phase information includes only phase information of the beam transmitting or reflecting part of the object 40 to be measured, in the form of removing remaining information (i.e., information about light and curvature information of the object beam objective lens 50) except for the phase information of the beam transmitting or reflecting part of the object 40 that the acquired beam transmitting object hologram or the acquired beam reflecting object hologram has.

In the improved holographic reconstruction method according to an embodiment of the present disclosure described above, operation e) may include: respectively compensating the extracted phase information of the beam transmitting part of the object 40 to be measured or the extracted phase information of the beam reflecting part of the object 40 to be measured for distorted phase information by using a 2D phase unwrapping algorithm; calculating quantitative thickness information of the object 40 to be measured, by using the compensated phase information; and reconstructing a 3D shape of the object 40 to be measured, by using the calculated quantitative thickness information of the object 40.

The calculated thickness information may be expressed as in Equation 5 below:

$$\Delta L = \frac{\lambda(\Delta\phi_T(x,y) + \Delta\phi_T(x,y))}{2\pi \, \Delta n(x,y)} \quad (5)$$

wherein ΔL denotes the quantitative thickness information of the object 40 to be measured, λ denotes a wavelength of a light source used when acquiring the object hologram, $\Delta\Phi_T(x,y)$ denotes the phase information of the beam transmitting part of the object 40, $\Delta\Phi_R(x,y)$ denotes the phase information of the beam reflecting part of the object 40, and Δn(x,y) denotes a difference between refractive indexes of the object 40 and air.

As described above, in the improved holographic reconstruction device 1 and method according to the present disclosure, 3D information of the object 40 to be measured may be reconstructed by directly generating a calculated digital reference hologram from the object hologram by using the processor 90, thereby solving a complicated optical device structure and consequent considerable cost that are needed for a one-shot digital holography reconstruction using a single object hologram image, according to the related art.

Also, according to the improved holographic reconstruction device 1 and method according to the present disclosure, the improved holographic reconstruction device 1 additionally uses only the processor 90, and thus an entire construction thereof may be greatly simplified, and a holographic reconstruction may be achieved at low cost.

In addition, in the improved holographic reconstruction device 1 and method according to the present disclosure, the other elements other than the processor 90 and the position adjustment mirror 70 have the substantially same constructions as reflective and transmissive holographic reconstruction devices of the related art and thus have versatility of being easily applicable to all the reflective and transmissive holographic reconstruction devices of the related art.

Moreover, in the improved holographic reconstruction device 1 and method according to the present disclosure, in particular, unlike the related art, a reference beam does not need to be used for a hologram reconstruction, and a quantitative 3D image reconstruction of the object 40 to be measured may be achieved in real time.

Furthermore, the improved holographic reconstruction device 1 and method according to the present disclosure, as described above, may achieve the quantitative 3D image reconstruction of the object 40 to be measured in real time without using the reference beam, and thus may be applied to devices used for detecting defects of ultrafine structures such as TFTs and semiconductors, medical devices needing displaying precise three-dimensional images, and devices used for detecting, verifying, or displaying various fields including refractive index error detections of transparent objects such as other lens, and the like.

Besides, in the improved holographic reconstruction device 1 and method according to the present disclosure, a digital hologram may be measured regardless of optical characteristics of an object to be measured by selectively selecting a transmissive mode and a reflective mode by an all-in-one type system integrating the reflective and transmissive holographic reconstruction devices of the related art, and thus additional cost may be solved.

While the present disclosure has been particularly shown and described with reference to embodiments thereof, various changes in form and details may be made therein without departing from the spirit and scope of the present disclosure.

What is claimed is:

1. A holographic reconstruction device comprising:
   a light source unit configured to emit single wavelength light;
   a first beam splitter configured to split the single wavelength light emitted from the light source unit into a first transmitted split beam and a second transmitted split beam;
   a plurality of optical mirrors configured to reflect the first transmitted split beam split by the first beam splitter;
   a second beam splitter configured to split the second transmitted split beam split by the first beam splitter into a first reflected split beam and a second reflected split beam;
   an object beam objective lens configured to allow the first transmitted split beam reflected from the plurality of optical mirrors and then transmitted through an object to be measured or the first reflected split beam split by the second beam splitter to pass therethrough;
   a reference beam objective lens configured to allow the second reflected split beam split by the second beam splitter to pass therethrough;
   a position adjustment mirror to which the second reflected split beam passing through the reference beam objective lens is transmitted;
   a recording medium configured to record an interference pattern formed when the first transmitted split beam transmitted through the object to be measured or the first reflected split beam reflected from a surface of the object to be measured and the second reflected split beam passing through the reference beam objective lens and reflected from the position adjustment mirror respectively pass through the object beam objective lens and the reference beam objective lens and are transmitted to the second beam splitter; and
   a processor configured to receive and store an image file generated by converting the interference pattern transmitted from the recording medium, wherein
   the processor is configured to selectively acquire a beam transmitting object hologram and a beam reflecting object hologram according to a transmissive mode and a reflective mode.

2. The holographic reconstruction device of claim 1, wherein the beam transmitting object hologram is expressed as a complex conjugated hologram corresponding to an interference pattern for a beam transmitting part of the object to be measured as in Equation 1 below:

$$|U_T(x,y,0)|^2 = |O_T(x,y)|^2 + |R_T(x,y)|^2 + O^*_T(x,y)R_T(x,y) + O_T(x,y)R^*_T(x,y) \quad (1)$$

wherein x and y denote spatial coordinates, $U_T(x,y,0)$ denotes the acquired beam transmitting object hologram, $O_T(x,y)$, $R_T(x,y)$ denote an object beam and a reference beam of the beam transmitting object hologram, and $O^*_T(x,y)$, $R^*_T(x,y)$ denote complex conjugates of the object beam and the reference beam of the beam transmitting object hologram.

3. The holographic reconstruction device of claim 2, wherein the beam transmitting object hologram is the interference pattern formed for the beam transmitting part of the object to be measured, by the first transmitted split beam and the second transmitted split beam.

4. The holographic reconstruction device of claim 1, wherein the beam reflecting object hologram is expressed as a complex conjugated hologram corresponding to an interference pattern for a beam reflecting part of the object to be measured as in Equation 2 below:

$$|U_R(x,y,0)|^2 = |O_R(x,y)|^2 + |R_R(x,y)|^2 + O^*_R(x,y)R_R(x,y) + O_R(x,y)R^*_R(x,y) \quad (2)$$

wherein x and y denote spatial coordinates, $U_R(x,y,0)$ denotes the acquired beam reflecting object hologram, $O_R(x,y)$, $R_R(x,y)$ denote an object beam and a reference beam of the beam reflecting object hologram, and $O^*_R(x,y)$, $R^*_R(x,y)$ denote complex conjugates of the object beam and the reference beam of the beam reflecting object hologram.

5. The holographic reconstruction device of claim 4, wherein the beam reflecting object hologram is the interference pattern formed for the beam reflecting part of the object to be measured, by the first reflected split beam and the second reflected split beam.

6. The holographic reconstruction device of claim 1, wherein:
   the processor is configured to correct a difference in an optical path of light in the transmissive mode and the reflective mode by adjusting a position of the position adjustment mirror, and
   the beam transmitting object hologram and the beam reflecting object hologram are configured to be transmitted from the recording medium to the processor to be acquired in the form of an image file.

* * * * *